United States Patent [19]

Bahl et al.

[11] Patent Number: 4,553,814

[45] Date of Patent: Nov. 19, 1985

[54] DETACHABLE FIBER OPTIC CONNECTOR ASSEMBLY

[75] Inventors: Andrew L. Bahl; George R. Stilwell, Jr; Edward C. Uberbacher, all of Raleigh; Charles A. Williamson, Apex, all of N.C.

[73] Assignee: International Business Machines Corporation, Armonk, N.Y.

[21] Appl. No.: 531,886

[22] Filed: Sep. 14, 1983

[51] Int. Cl.⁴ .............................. G02B 7/26
[52] U.S. Cl. .................. 350/96.21; 350/96.20
[58] Field of Search .......... 350/96.20, 96.21, 96.22, 350/96.23

[56] References Cited

U.S. PATENT DOCUMENTS

| 4,076,376 | 2/1978 | Slaughter | 350/96.21 |
| 4,076,379 | 2/1978 | Chouinard | 350/96.22 |
| 4,186,998 | 2/1980 | Holzman | 350/96.21 |
| 4,225,214 | 9/1980 | Hodge et al. | 350/96.21 |
| 4,291,941 | 9/1981 | Melzer | 350/96.21 X |
| 4,355,862 | 10/1982 | Kock | 350/96.20 |
| 4,396,248 | 8/1983 | Bientz et al. | 350/96.21 |

*Primary Examiner*—John Lee
*Attorney, Agent, or Firm*—Gerald R. Woods

[57] ABSTRACT

A detachable fiber optic connector assembly consists of two major components, a cable terminator and a connector unit. The cable terminator includes a collar which is glued or crimped onto the cable jacket adjacent the stripped end of the cable and a cylindrical housing which is trapped on the cable by the collar. The connector unit includes a short length of permanently-retained fiber with one exposed end. This unit further includes a splice sleeve for receiving the stripped end of the cable fiber and the other end of the permanently-retained fiber. The cable terminator and the connector unit have latches, such as BNC components, for detachably coupling the connector unit to the cable terminator.

12 Claims, 8 Drawing Figures

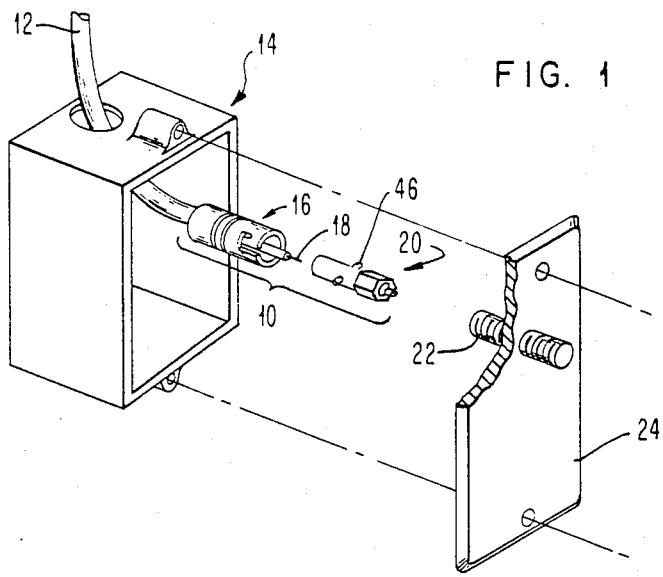
FIG. 1
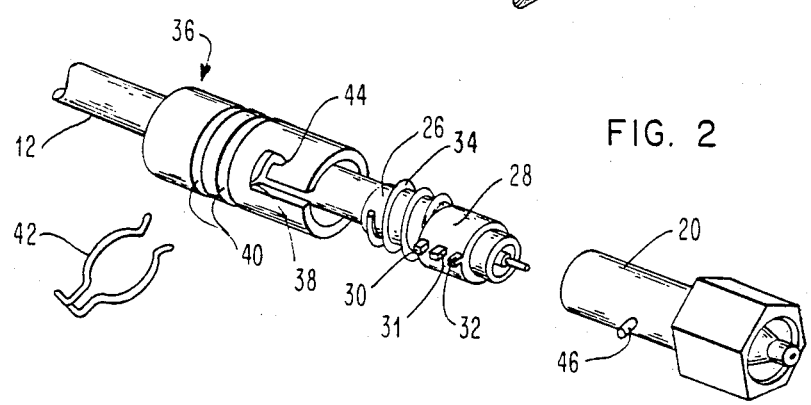
FIG. 2
FIG. 3
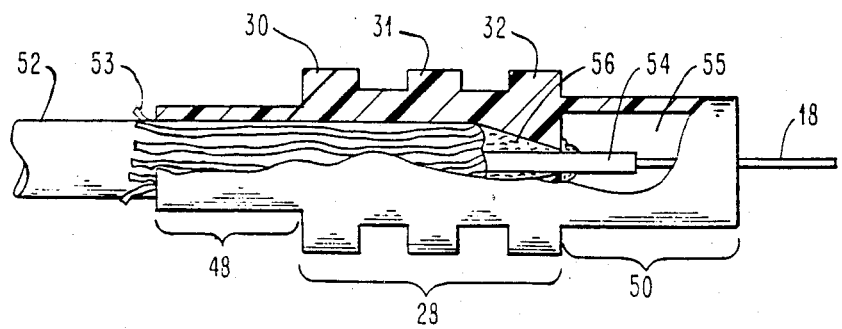

DETACHABLE FIBER OPTIC CONNECTOR ASSEMBLY

FIELD OF THE INVENTION

The present invention relates to connectors and more particularly to a detachable fiber optic connector assembly.

BACKGROUND OF THE INVENTION

Manufacturers and users of both voice and data communication systems have been very interested in optical fibers as a transmission medium. The advantages of fibers over other kinds of transmission media are well known. The potential bandwidth (or message carrying capacity) of optical fibers is extremely high. Systems using optical cables are resistant to electromagnetic interference which sometimes plagues systems having electrical cables. Moreover, optical cable systems are considered somewhat more secure than electrical cable systems since it is more difficult for unauthorized personnel to tap or access a fiber optic cable without being detected.

Problems have been encountered, however, in transferring fiber optic technology from the readily controlled environment of research and development facilities to the often not-so-readily controlled environment of the commercial world. One of these problems is that the high levels of system performance in a research and development environment can be attributed, at least in part, to the fact that a system is normally assembled by highly motivated, highly trained technical personnel. Such personnel are normally quite careful when handling cables and attaching connectors to minimize energy losses at connector-to-connector or connector-to-device interfaces.

The same system which performs well in a research and development environment may prove totally unacceptable in a commercial environment. Commercially available connectors, while varying in many respects, require that an in-the-wall or transmission fiber extend completely through the connector with the end of the fiber providing the optical interface between that connector and another connector or device. To minimize losses at such an interface, the end of the fiber must be carefully cut and polished. This can be achieved without substantial difficulty in a research and development environment.

In a commercial environment, however, a cable may be prepared and connectors may be mounted by personnel who lack the motivation or the training required to properly carry out such a job. If the optical fiber is not prepared correctly or the connector is not mounted correctly, the losses at the connector can be unacceptably high. With commercially available connectors, the only alternative in such a situation is to remove the old connector by sacrificing a length of cable and repeat the entire process of mounting a new connector. Repeated installation attempts can shorten the in-the-wall cable to the extent that the entire cable has to be replaced. To avoid this, the alternative has been to provide a great deal of excess cable at each outlet to allow the repeated sacrifices that might be necessary.

U.S. Pat. No. 4,220,394 represents a partial solution to the problems inherent in commercially available connectors. In the fiber optic connector disclosed in that patent, the connector body includes a short length of a permanently retained fiber. This short length of fiber can be fusion welded to the fiber in a transmission cable through the use of an oxyhydrogen micro-blowpipe. The problem with the connector proposed by this patent is that any failure to achieve satisfactory losses upon first installation of the connector can be remedied only by either breaking the weld formed within the connector or by cutting the cable at a point beyond the connector. In either event, a considerable length of the transmission cable is sacrificed before a new or reworked connector can be mounted on the transmission cable.

SUMMARY OF THE INVENTION

The present invention is a detachable fiber optic connector which is not subject to the problems known to exist with commercially available connectors or with the connector proposed in the cited patent.

A connector assembly constructed in accordance with the present invention includes two major components. The first major component is a cable terminator which is permanently secured to the protective jacket of the cable at a stripped end. This component includes a generally cylindrical housing which slides along the protective jacket and a retaining collar which is immovably secured to the protective jacket at the stripped end. The exposed end of the cable fiber extends beyond the retaining collar. The second major component is a connector unit which includes a housing having a permanently retained optical medium. The medium has an exposed face at one end and guide means at the opposite end for guiding the exposed end of the cable fiber into optical communication with the medium. The two major components have complementary fastening means for releasably securing the connector unit to the cable terminator.

It should be noted that the cable fiber is not welded or otherwise permanently secured to the optical medium within the connector unit. If the connector unit needs to be replaced for some reason, it can readily be removed without sacrificing any part of the optical cable.

BRIEF DESRIPTION OF THE DRAWINGS

While the specification concludes with claims particularly pointing out and distinctly claiming that which is regarded as the present invention, further details of a preferred embodiment of the invention may be more readily ascertained from the following technical description when read in conjunction with the accompanying drawings wherein:

FIG. 1 is a perspective view of a partially assembled connector in the environment of a commercial optical outlet;

FIG. 2 is a more detailed perspective view of the major components of the connector assembly;

FIG. 3 is a partial cross-section of a collar used in the cable terminator;

TECHNICAL DESCRIPTION

Figure 4:
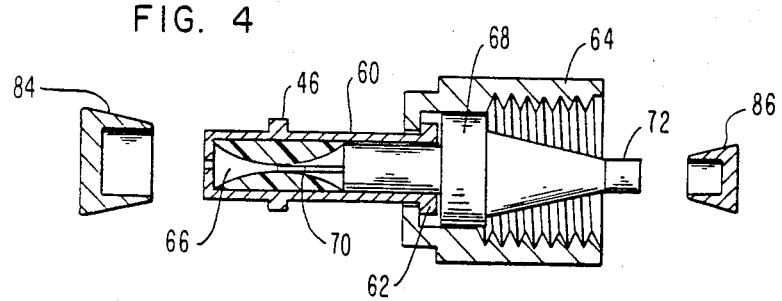
FIG. 4 is a partial cross-sectional view of the elements of the connector unit.

Referring to FIG. 1, a detachable fiber optic connector assembly 10 constructed in accordance with the present invention is mounted on an optical cable 12 which may be confined within the walls of a building and terminated at a junction box 14. The connector assembly 10 consists of two major components, a cable terminator 16 mounted at the stripped end of fiber 18 in cable 12 and a connector unit 20 which can be detachably coupled to terminator 16 by means more fully described below. Connector unit 20 can be attached to a post 22 on one side of a cover plate 24 for the junction box 14. When connector unit 20 is installed on post 22, an optical fiber which is a permanent part of unit 20 extends approximately half-way through the hollow interior of post 22. A similar connector on a cable for a terminal device (not shown) can be installed on the opposite end of post 22 to establish an optical path between cable 12 and the terminal device.

FIG. 2 illustrates the cable terminator 16 in more detail. The terminator 16 includes a collar 26 which has an enlarged flange 28. Flange 28 carries longitudinally-spaced, radially-extending lugs 30, 31 and 32 which are used in limiting radial and longitudinal stresses in cooperation with other elements described below. Collar 26 is immovably secured to the protective jacket of cable 12 and serves to retain both a coil spring 34 and a generally cylindrical housing 36 which has an opening therethrough slightly larger than the outside diameter of the cable's protective jacket. Both coil spring 34 and housing 36 must be installed on the cable before the collar 26 is secured to the cable. Generally cylindrical housing 36 includes an interior, longitudinal keyway 38 which can be aligned with lugs 30, 31 and 32. When housing 36 is slid forward over collar 26, the lugs enter the keyway 38 and prevent relative rotational movement between housing 36 and collar 26. Rotational torque exerted on cable 12 can be transferred through housing 36 and connector unit 20 to the wallplate 24 and junction box 14 without torque being imposed on the junction of the two optical fibers. The housing 36 includes one or preferably more circumferential grooves 40 which completely penetrate the housing wall in the region of the keyway 38. A spring clip 42 can be seated in one of these grooves to limit axial stresses on the cable 12 within the connector.

When collar 26 has been installed with spring 34 and housing 36 trapped by the collar, the connector unit 20 can be detachably coupled to the cable terminator 16 by complementary latching means. In the illustrated embodiment, the latching means consists of conventional BNC elements including diametrically-opposite J-shaped openings 44 in cylindrical housing 36 and diametrically-opposite pins 46 on subassembly 20.

FIG. 3 is a cross-sectional view of the collar 26. Collar 26 includes a shank 48, flange 28 and a thin-walled cylindrical extension 50 which forms a buckle chamber 55 providing space for any excess length of fiber 18 if it is distorted or bent during assembly. Before collar 26 is mounted on the cable, the cable is prepared by stripping the protective jacket 52 from a given length of fiber and the cladding 54 from a shorter length. Strength fibers 53 between jacket 52 and cladding 54 are folded back over jacket 12. A coating of suitable adhesive 56 is spread over the region of the strength fibers 53 and the collar 26 is slipped into place. Adhesive 56 may be one which results in a bond between the material in jacket 52 and the material of collar 26. The excess adhesive 56 tends to center the fiber 18 in the interior of buckle chamber 55. Fiber 18 is, however, unsupported over a short length and extends beyond the end of collar 26. The protruding length of fiber 18 is received in a splice sleeve in the connector unit 20 in a manner described in more detail below.

FIG. 4 is a partial cross-sectional view of the components of the connector unit 20. Unit 20 includes an extension 60 with a flange 62 which retains a freely-rotatable threaded nut 64. A splice sleeve 66 is fitted into the interior of extension 60 and connector body 68 is inserted into the large chamber defined by nut 64. It should be noted that connector body 68 carries a fiber 70 which is installed in a controlled, factory environment assembly operation. A length 70 of the fiber protrudes from one end of connector body 68. The opposite end of the fiber (at face 72) is polished in the controlled, factory environment to minimizes optical losses at the face. Dust caps 84 and 86 complete the connector unit 20 and are left in place during shipping and until use to protect the fiber faces from physical damage or dust contamination.

Figure 5:
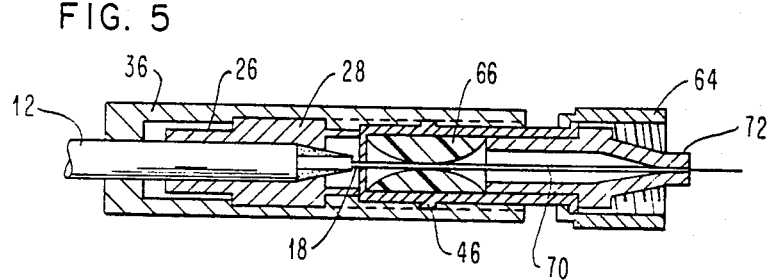
FIG. 5 is a cross-sectional view of a completed connector assembly.

FIG. 5 is a cross-sectional view of an assembled connector. This view shows that fiber 18 from cable terminator 16 enters the splice sleeve 66 from the left side while fiber 70 from the connector body 68 enters the splice sleeve from the right side. The two fiber ends are brought into contact with a predetermined force as coil spring 34 forces the collar 26 with fiber 18 to the right.

If the spring force is great enough, cable 18 may buckle or distort into the chamber 55.

Figure 6:
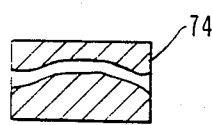
FIGS. 6 through 8 represent alternate embodiments for a splice sleeve which might be used in the connector unit.
Figure 7:
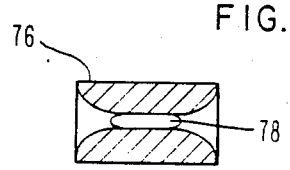
Figure 8:
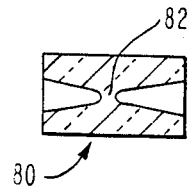

The illustrated splice sleeve is a conventional glass tunnel construction. Other splice sleeves, also conventional in nature, could also be used. FIG. 6 illustrates a splice sleeve 74 having a curved path tunnel in which the path curvature brings the ends of two fibers into alignment. FIG. 7 shows a splice sleeve 76 similar to sleeve 66 except that sleeve 76 carries a small amount of index matching fluid 78 for improving the optical coupling between inserted fibers. FIG. 8 discloses still another splice sleeve 80 which contains only a partial tunnel. A web 82 of sleeve material serves as a lens for completing optical coupling between inserted fibers.

Having thus described my invention with reference to a preferred embodiment therein, what I desire to protect by Letters Patent is:

1. A connector assembly for an optical fiber cable of the type including a protective jacket characterized by:
  a cable terminator permanently secured at one end of the cable and further including
   a generally cylindrical housing slidable along the protective jacket, and
   a collar immovably secured to the protective jacket for retaining the generally cylindrical housing, an exposed end of said fiber extending beyond the collar; and
  a connector unit including
   a housing, and
   an optical medium permanently retained within said housing, said medium having an exposed face at one end and guide means at the opposite end for guiding the exposed end of said fiber into optical communication with said medium,
  said housings in both said cable terminator and said connector unit having complementary fastening means for releasably securing said connector unit to said cable terminator.

2. A connector assembly as defined in claim 1 wherein said collar is further characterized by a cylindrical extension of the collar adjacent the exposed end of said fiber, the inside diameter of said extension being significantly greater than the outside diameter of the exposed fiber to provide a buckle region for the fiber.

3. A connector assembly as defined in claim 2 wherein the optical medium in said connector unit is further characterized by:
a short length of optically transparent material having first and second exposed faces; and
a separate splice sleeve contiguous to and in optical communication with said short length of material at one end and having guide means at its opposite end for receiving the exposed end of said fiber.

4. A connector assembly as defined in claim 3 wherein the short length of optically transparent material is further characterized as an optical fiber permanently secured within said housing.

5. A connector assembly as defined in claim 4 further characterized by a coil spring encircling the protective jacket of the optical fiber cable and trapped between said generally cylindrical housing and said collar, said spring being adapted to exert a predetermined force on the connector unit when said unit is secured to said cable terminator.

6. A connector assembly as defined in claim 5 wherein said complementary fastening means is further characterized as at least two J-shaped openings in the wall of said generally cylindrical housing and at least two pins extending from the exterior surface of said connector housing, said pins having the same angular separation as corresponding regions of said J-shaped openings.

7. A connector assembly as defined in claim 5 further characterized by means for limiting relative rotational movement between said generally cylindrical housing and said collar.

8. A connector assembly as defined in claim 7 wherein said rotational limiting means is further characterized by at least one radially extending lug on said collar and at least one interior, longitudinally-extending keyway in said generally cylindrical housing.

9. A connector assembly as defined in claim 5 further characterized by means for limiting axial movement of said generally cylindrical housing relative to said collar characterized by:
at least two longitudinally-spaced, radially-extending lugs on said collar;
at least one opening in the wall of said generally cylindrical housing providing access to the space between any two of said lugs; and
securing means inserted through said opening into said space.

10. A connector assembly as defined in claim 9 wherein said axial movement limiting means is further characterized by each said opening being in a cylindrical groove encircling said generally cylindrical housing and by said securing means being a wire form spring clip which can be seated in said cylindrical groove.

11. A connector assembly as defined in claim 9 further characterized by means for limiting relative rotational movement between said generally cylindrical housing and said collar.

12. A connector assembly as defined in claim 11 further characterized by an interior, longitudinally-extending keyway in said generally cylindrical housing, and a longitudinally-spaced, radially-extending lug on said collar, said lug being received within said keyway.

* * * * *